United States Patent
Akagawa (10) Patent No.: US 9,630,798 B2
(45) Date of Patent: Apr. 25, 2017

(54) IMAGE FORMING APPARATUS (71) Applicant: Sharp Kabushiki Kaisha, Osaka (JP)

(72) Inventor: Yuhi Akagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/089,539

(22) Filed: Apr. 2, 2016

(65) Prior Publication Data
US 2016/0214824 A1 Jul. 28, 2016

Related U.S. Application Data (63) Continuation of application No. 14/405,954, filed as application No. PCT/JP2013/067236 on Jun. 24, 2013, now abandoned.

(30) Foreign Application Priority Data

Jun. 25, 2012 (JP) ................. 2012-141577

(51) Int. Cl.
*B65H 37/00* (2006.01)
*B65H 5/06* (2006.01)
(Continued)

(52) U.S. Cl.
CPC ............. *B65H 37/00* (2013.01); *B65H 1/04* (2013.01); *B65H 1/266* (2013.01); *B65H 1/28* (2013.01);
(Continued)

(58) Field of Classification Search
CPC . B65H 1/04; B65H 1/28; B65H 31/22; B65H 31/24; B65H 2402/42; B65H 2402/40; G03G 21/1642; G03G 21/1647
(Continued)

(56) References Cited

U.S. PATENT DOCUMENTS 6,112,047 A * 8/2000 Kato .................. B65H 29/00
271/279
8,485,653 B2 7/2013 Katsuyama et al.
(Continued)

FOREIGN PATENT DOCUMENTS

DE 3219784 A1 12/1982
JP DE 3219784 A1 * 12/1982 ............... B65H 1/04
(Continued)

OTHER PUBLICATIONS

Co-pending U.S. Appl. No. 14/405,954, filed Dec. 5, 2014.
International Search Report for corresponding International Application No. PCT/JP2013/067236 mailed Aug. 13, 2013.

*Primary Examiner* — Patrick Cicchino
(74) *Attorney, Agent, or Firm* — Renner, Otto, Boisselle & Sklar, LLP (57) ABSTRACT

An image forming apparatus (10) includes an apparatus main body (20), a first processing unit (30) and a second processing unit (40). The apparatus main body (20) performs an image forming process onto a paper sheet. The first processing unit (30) and the second processing unit (40) are disposed in vertical direction (91) such that one is located on an upside of the other on a same side face's side of the apparatus main body 20. The second processing unit (40) is disposed on the upside of the first processing unit (30), and is configured in such a manner as to be capable of being slidingly moved in an approaching-leaving direction (92) in relation to the apparatus main body (20).

12 Claims, 8 Drawing Sheets

(51) Int. Cl.
*B65H 1/04* (2006.01)
*B65H 1/28* (2006.01)
*B65H 1/26* (2006.01)
*G03G 21/16* (2006.01)

(52) U.S. Cl.
CPC ......... *B65H 5/062* (2013.01); *G03G 21/1604* (2013.01); *G03G 21/1647* (2013.01)

(58) Field of Classification Search
USPC .......................................... 399/110; 271/9.12
See application file for complete search history.

(56) References Cited

U.S. PATENT DOCUMENTS

| | | | | |
|---|---|---|---|---|
| 2002/0121734 | A1* | 9/2002 | Ogita | B65H 31/22 270/58.08 |
| 2003/0198494 | A1* | 10/2003 | Kenji | B65H 29/58 399/381 |
| 2004/0005166 | A1 | 1/2004 | Funakoshi | |
| 2004/0047652 | A1 | 3/2004 | Ohgita et al. | |
| 2004/0256783 | A1* | 12/2004 | Iida | B65H 29/001 270/58.08 |
| 2005/0025515 | A1 | 2/2005 | Funakoshi | |
| 2008/0023909 | A1* | 1/2008 | Justice | B65H 1/04 271/207 |
| 2010/0194036 | A1* | 8/2010 | Tsuchihashi | B65H 31/24 271/279 |
| 2013/0009357 | A1* | 1/2013 | Takimoto | G03G 15/6552 271/225 |
| 2014/0212167 | A1* | 7/2014 | Agata | G03G 21/1647 399/107 |
| 2015/0050060 | A1* | 2/2015 | Kim | B65H 31/02 399/407 |

FOREIGN PATENT DOCUMENTS

| | | |
|---|---|---|
| JP | 2002-308520 A | 10/2002 |
| JP | 2004-037942 A | 2/2004 |
| JP | 2004-101605 A | 4/2004 |
| JP | 2004-230880 A | 8/2004 |
| JP | 2005-082325 A | 3/2005 |
| JP | 2006-143403 A | 6/2006 |
| JP | 2008-139548 A | 6/2008 |
| JP | 2008-275694 A | 11/2008 |
| JP | 2009-001362 A | 1/2009 |

* cited by examiner

IMAGE FORMING APPARATUS

TECHNICAL FIELD

The present invention relates to a processing device having a first processing unit and a second processing unit that are disposed on side face's side of an apparatus main body that performs an image forming process onto a paper sheet, and to an image forming apparatus provided with the same.

BACKGROUND ART

Conventionally, among image forming apparatus are ones each provided with a processing device having a plurality of processing units to expand functionality, apart from an apparatus main body that performs an image forming process onto a paper sheet. For example, for the processing unit, a paper feeder capable of containing an extensive number of paper sheets to supply to the apparatus main body, and a post-processor applying a post-processing to paper sheets onto which the image forming process have been performed by the apparatus main body can be given. However, in a case where a first processing unit and a second processing unit are provided on either side face on opposite sides of the apparatus main body, an installation area of the image forming apparatus increases.

Then, an image forming apparatus having a paper receiving tray disposed on an upside of a paper feed tray became known (for example, refer to Patent Literature 1). In this conventional image forming apparatus, the paper receiving tray and the paper feed tray are provided so as to be disposed in vertical direction such that one is located on the upside of the other, and thereby reduction of the installation area is sought as compared with the case where the paper feed tray and the paper receiving tray are provided on either side face on opposite sides of the apparatus main body.

CITATION LIST

Patent Literature

Patent Literature 1: Japanese Patent Unexamined Publication No. 2004-230880 bulletin

SUMMARY OF INVENTION

Technical Problem

However, in conventional image forming apparatus, it is not possible for the paper feed tray and the paper receiving tray to be slidingly moved in an approaching-leaving direction in relation to the apparatus main body; so that when a paper sheet having been fed or discharged causes conveyance failure at a connection section with the apparatus main body, it is not easy to carry out its maintenance tasks such as removing the paper sheet and/or the like.

Moreover, in conventional image forming apparatus, the objects disposed in vertical direction such that one is located on the upside of other are light weight and structurally simple members such as paper feed tray and paper receiving tray; that is, they are not processing units. In conventional image forming apparatus, although the paper feed tray and the paper receiving tray are configured in such a manner as to be swingable, such a configuration is possible only when the paper feed tray and the paper receiving tray are light-weight; so that it is difficult to apply the same configuration to relatively heavy processing units. Therefore, with the configuration of conventional image forming apparatus, it is difficult to perform maintain tasks on the processing units.

The present invention is directed to providing a processing device making it possible to reduce installation area thereof and perform maintenance tasks on processing units thereof that are provided on side face's side of an apparatus main body easily, and an image forming apparatus provided with the same.

Solution to Problem

A processing device of the present invention includes a first processing unit and a second processing unit. The first processing unit and the second processing unit are disposed in vertical direction such that one is located on an upside of the other on a same side face's side of an apparatus main body performing an image forming process onto a paper sheet. The second processing unit is disposed on the upside of the first processing unit, and is configured in such a manner as to be capable of being slidingly moved in an approaching-leaving direction in relation to the apparatus main body. An image forming apparatus of the present invention includes an apparatus main body and the processing device.

In this configuration, with the first processing unit and the second processing unit being disposed in vertical direction such that one is located on the upside of the other on the same side face's side of the apparatus main body, an installation area can be reduced as compared with a case where the first processing unit and the second processing unit are disposed on either side face on opposite sides of the apparatus main body. Besides, since the second processing unit is capable of being slidingly moved in the approaching-leaving direction in relation to the apparatus main body, a connection section between the second processing unit and the apparatus main body can be opened to the environment; and thus workability on the connection section improves. Therefore, even when a conveyance failure occurs between the second processing unit and the apparatus main body, maintenance tasks such as removing a paper sheet and/or the like can be carried out easily. Further, workability from upside on the first processing unit increases by slidingly moving the second processing unit of upside to cause part of a top face of the first processing unit to be exposed to outside. Thus, maintenance tasks on the first processing can also be performed easily.

Advantageous Effects of Invention

The present invention makes it possible to reduce an installation area and easily perform maintenance tasks on a first processing unit and a second processing unit that are provided on one side face of an apparatus main body.

DESCRIPTION OF EMBODIMENTS

Figure 1:
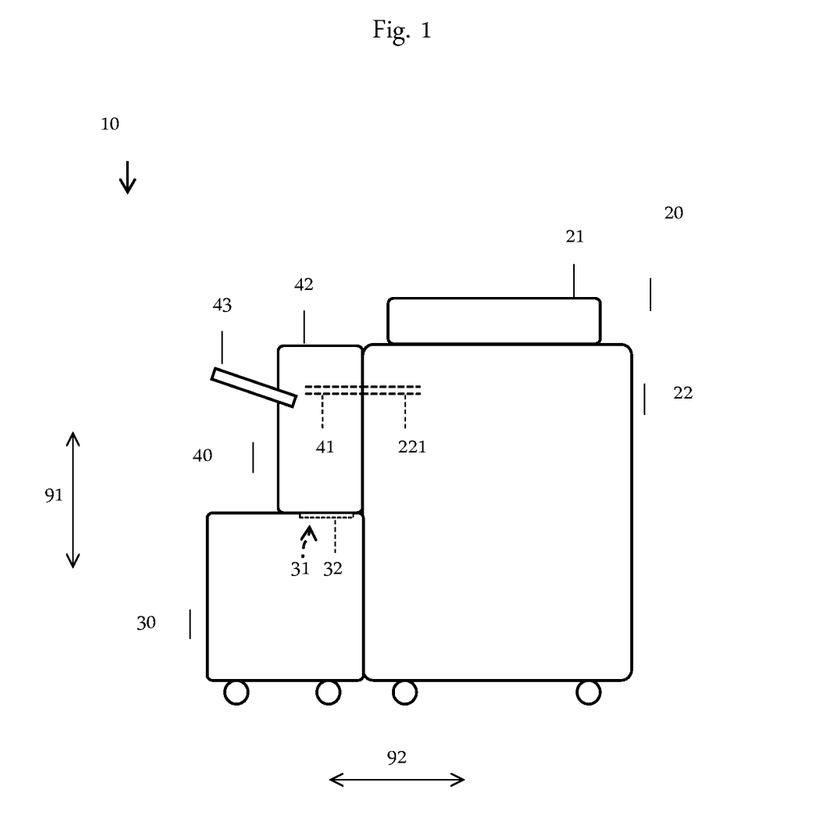
FIG. 1 is a front view showing a general configuration of an image forming apparatus according to an embodiment of the present invention.

As shown in FIG. 1, an image forming apparatus 10 according to an embodiment of the present invention includes an apparatus main body 20, a first processing unit 30 and a second processing unit 40. The image forming apparatus 10 is not limited in particular as long as it performs an image forming process onto a paper sheet. For the image forming apparatus 10, for example, copiers and printers or line printers according to electrophotography method or ink jet printing method can be given.

The apparatus main body 20 has an automated document feeder (ADF: Auto Document Feeder) 21 and an image forming section 22, along with an image reading section and a paper feed cassette which are not illustrated. The ADF 21 conveys documents in such a manner that the documents go by way of a predetermined image reading position piece by piece. The image reading section reads an image of a document conveyed through the image reading position and thereby produces image data.

The paper feed cassette contains paper sheets, and supplies the paper sheets to the image forming section 22 piece by piece. The image forming section 22 performs an image forming process for forming an image onto the paper sheet based on the image data.

The first processing unit 30 and the second processing unit 40 are disposed in vertical direction 91 such that one is located on an upside of the other on a same side face's side of the apparatus main body 20. This enables an installation area to be reduced as compared with a case where the first processing unit 30 and the second processing unit 40 are disposed on different side faces of the apparatus main body 20 from each other.

The first processing unit 30 is linked to the apparatus main body 20 fixedly with the screws not illustrated. As an example, the first processing unit 30 is a paper feeder for containing an extensive number of paper sheets to supply to the image forming section 22. A paper sheet conveying path in the first processing unit 30 and a paper sheet conveying path for acceptance in the image forming section 22 are formed in such a manner as to be continuous between each other. The first processing unit 30 supplies the paper sheets to the image forming section 22 piece by piece as necessary. With the paper feeder being provided apart from the apparatus main body 20, since an extensive number of paper sheets can be contained in the paper feeder, the image forming process can be preformed continuously onto an extensive number of paper sheets for one refill.

Figure 2:
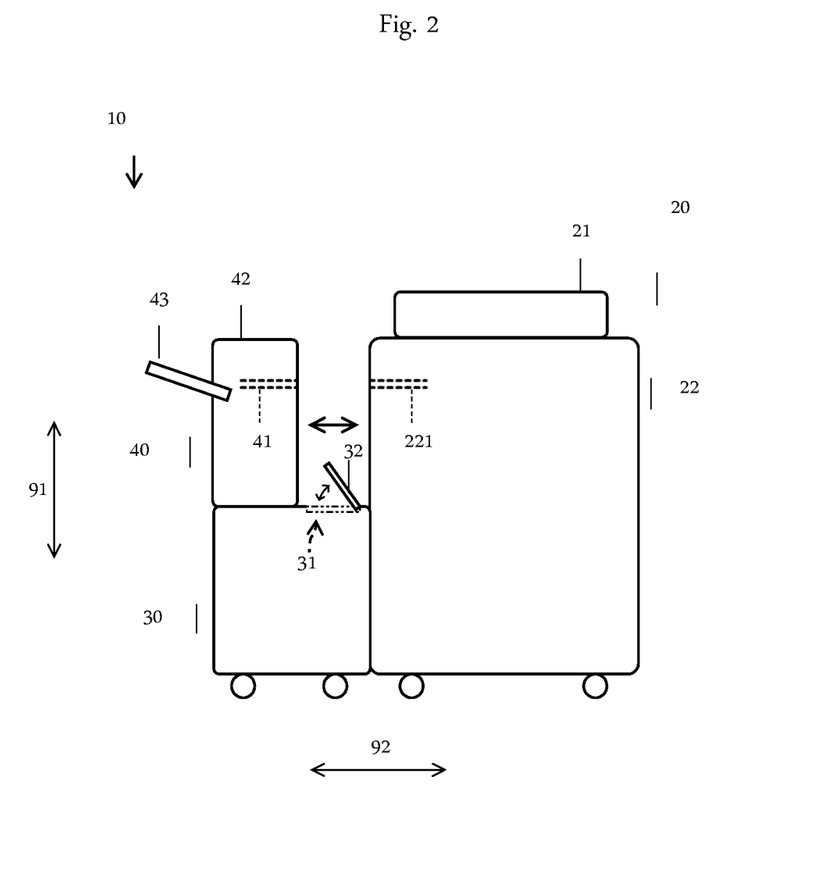
FIG. 2 is a front view of the image forming apparatus in a state where a second processing unit is disposed at a separate position.

The second processing unit 40 is disposed on the upside of the first processing unit 30. The second processing unit 40 is configured in such a manner as to be capable of being slidingly moved in an approaching-leaving direction 92 in relation to the apparatus main body 20 between an adjacent position that is adjacent to the apparatus main body 20 as shown in FIG. 1 and a predetermined separate position that is away from the apparatus main body 20 as shown in FIG. 2. The second processing unit 40 is disposed at the adjacent position when the apparatus main body 20 is in its operational state.

Figure 8:
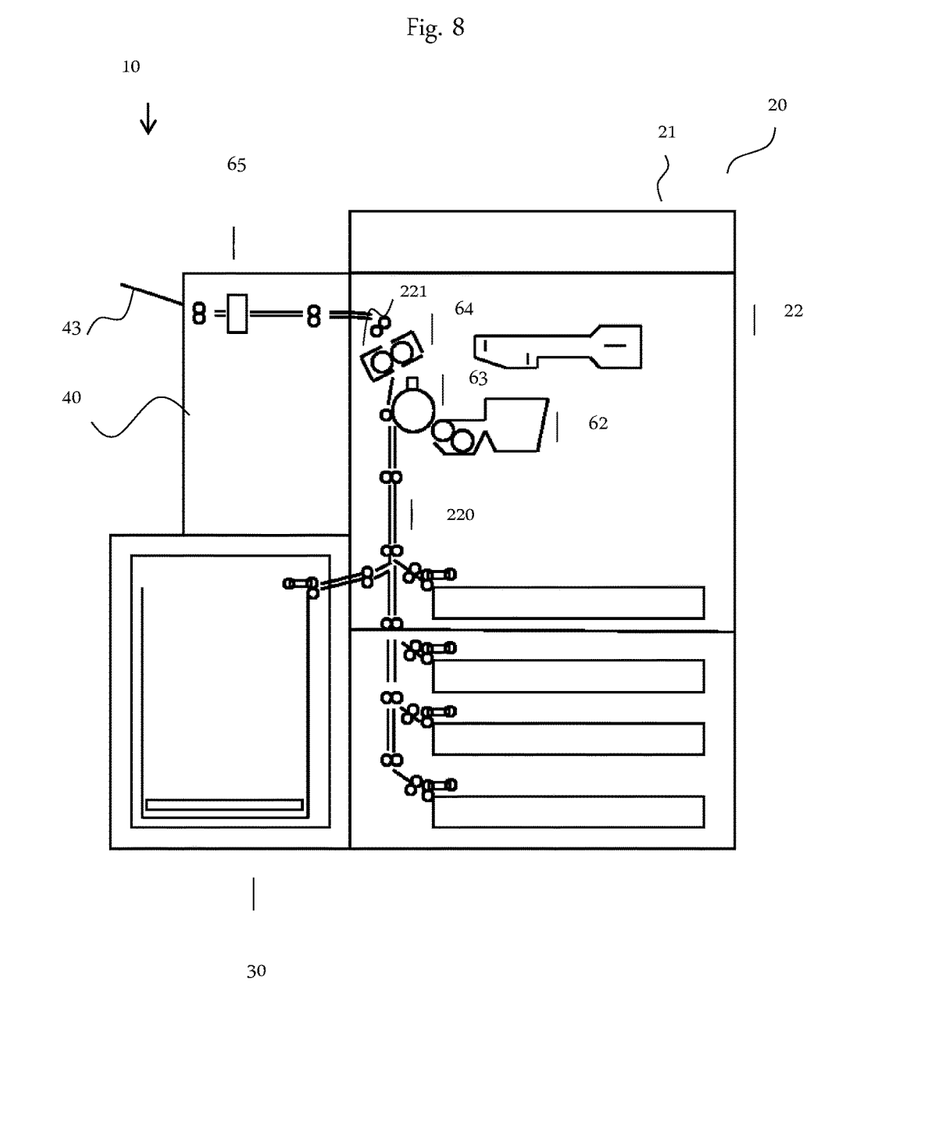
FIG. 8 is a schematic showing an embodiment of a configuration of paper sheet conveying paths in the first processing unit, the second processing unit and the apparatus main body.

As an example, the second processing unit 40 is a post-processor applying a post-processing to the paper sheets that have undergone the image forming process in the image forming section 22. At the adjacent position, a paper sheet conveying path 41 for acceptance in the second processing unit 40 continues to a paper sheet conveying path 221 for discharge in the image forming section 22; and thus the paper sheet that has undergone the image forming process is smoothly conveyed to the second processing unit 40. For example, for the post-processing, stapling process, punching process, Z-folding process, face up discharging process, face down discharging process, and/or sorting process can be given. With the post-processing being applied to the paper sheets that have undergone the image forming process, business processing efficiencies increase. Although a route of conveyance of the paper sheets is not limited in particular, as an example, in the case of a copier according to the electrophotography method, as shown in FIG. 8, the paper sheet, after having been fed by the first processing unit 30, is conveyed through a paper sheet conveying path 220, undergoes an image forming process performed by a developing section 62, a photoreceptor 63 and so forth, and then an image thus formed onto the paper sheet is fixed thereon by a fuser unit 64. Thereafter, the paper sheet is conveyed to the second processing unit 40 through the paper sheet conveying path 221, undergoes the punching process applied thereto by a punching section 65, and then is discharged onto the paper receiving tray 43.

As shown in FIG. 2, with the second processing unit 40 disposed at the separate position, a connection section between the second processing unit 40 and the apparatus main body 20 can be opened to the environment; so that workability on the connection section improves. Therefore, even when a problem such as conveyance failure or the like occurs between the second processing unit 40 and the apparatus main body 20, maintenance tasks such as removing a paper sheet and/or the like can be carried out easily.

The first processing unit 30 has on a top face thereof an opening section 31 of a size that permits the passage of image forming process related members. In the embodiment, the paper sheets are supplied to an interior of the first processing unit 30 through the opening section 31. In the state where the second processing unit 40 is disposed at the separate position, the opening section 31 is exposed to outside. In the embodiment, the first processing unit 30 includes a lid member 32 capable of opening and closing the opening section 31; thus the lid member 32 is exposed to outside when the second processing unit 40 is disposed at the separate position, and further the opening section 31 is released when the lid member 32 is opened.

In this manner, with the second processing unit 40 disposed at the separate position, part of the top face of the first processing unit 30 is exposed to outside; and thus workability from upside on the first processing unit 30 improves. In more concrete terms, by disposing the second processing unit 40 at the separate position and opening the lid member 32 to release the opening section 31, workability on the interior of the first processing unit 30 through the opening section 31 can be improved. Therefore, maintenance tasks on the first processing unit 30 can also be performed easily.

Figure 7A:
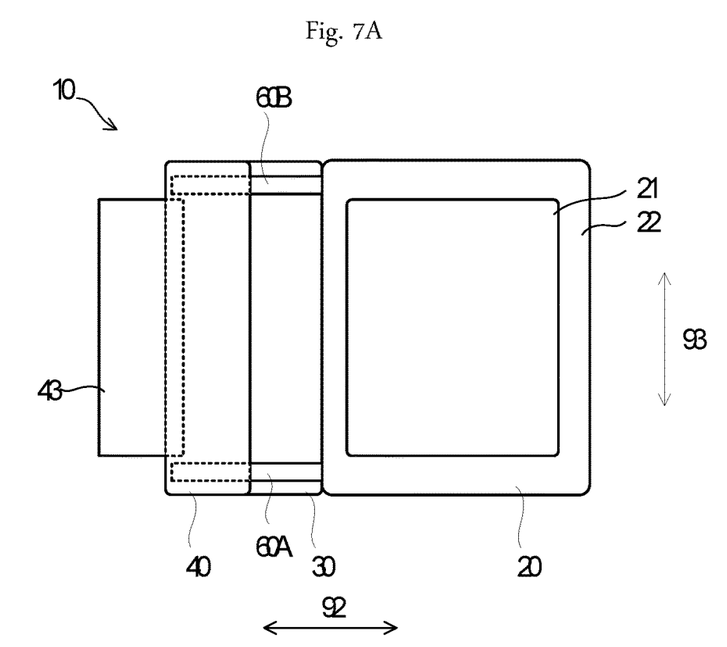
FIG. 7A is a top view showing a configuration in which the second processing unit is supported by a top face of a first processing unit in such a manner as to be capable of being slidingly moved.
Figure 7B:
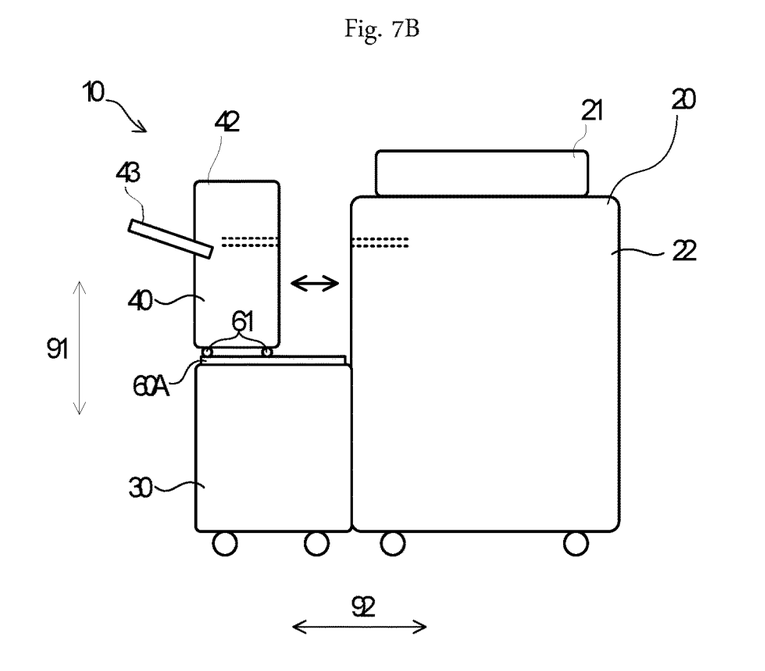
FIG. 7B is its front view.

It is preferable that the second processing unit 40 is configured in such a manner as to be capable of being slidingly moved in the approaching-leaving direction 92 while being supported by the top face of the first processing unit 30. As an example, as shown in FIG. 7A and FIG. 7B, a rail member 60A, 60B extending in the approaching-leaving direction 92 is laid on the top face of the first processing unit 30; rollers 61 are installed on a bottom face of the second processing unit 40; and the second processing unit 40 travels on the rail member 60A, 60B. With the second processing unit 40 slidingly moved while being supported by the top face of the first processing unit 30, unintended inclination of a path of movement of the second processing unit 40 in a depth direction 93 that is perpendicular to the approaching-leaving direction 92 or to the approaching-leaving direction 92 and the vertical direction 91 can be prevented.

Figure 3:
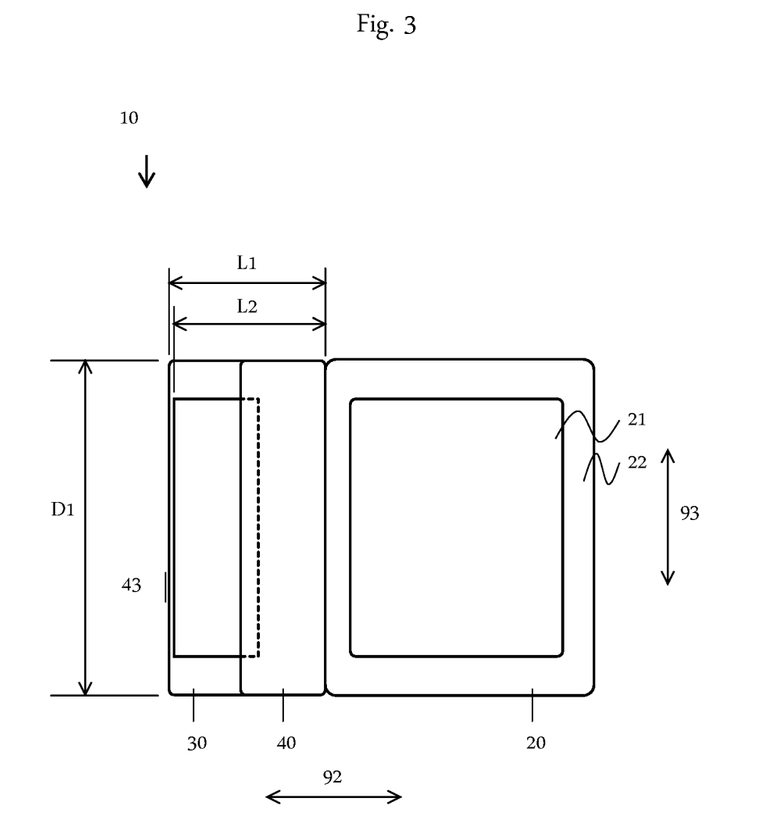
FIG. 3 is a top view of the image forming apparatus.

As shown in FIG. 3, it is preferable that dimensional values of the second processing unit 40 are not greater than dimensional values of the first processing unit 30 in the approaching-leaving direction 92 and the depth direction 93, respectively. In the embodiment, a dimensional value L2 of the second processing unit 40 is smaller than a dimensional value L1 of the first processing unit 30 in the approaching-leaving direction 92, and the second processing unit 40 and the first processing unit 30 have a same dimensional value D1 in the depth direction 93. Since the second processing unit 40 is not larger than the first processing unit 30 in plane view, the second processing unit 40 is stably supported by the first processing unit 30.

Although the second processing unit 40 is capable of being slidingly moved in the approaching-leaving direction 92, it is disposed so as not to jut out of the first processing unit 30 in plane view when the apparatus main body 20 is in its operational state. This makes it possible to further reduce the installation area of the image forming apparatus 10 when the apparatus main body 20 is in its operational state.

It is preferable that the second processing unit 40 is lighter than the first processing unit 30. Then a position of the center of gravity of the first processing unit 30 and the second processing unit 40 when regarded as one object becomes low, so that the second processing unit 40 is stably supported by the first processing unit 30.

Figure 4:
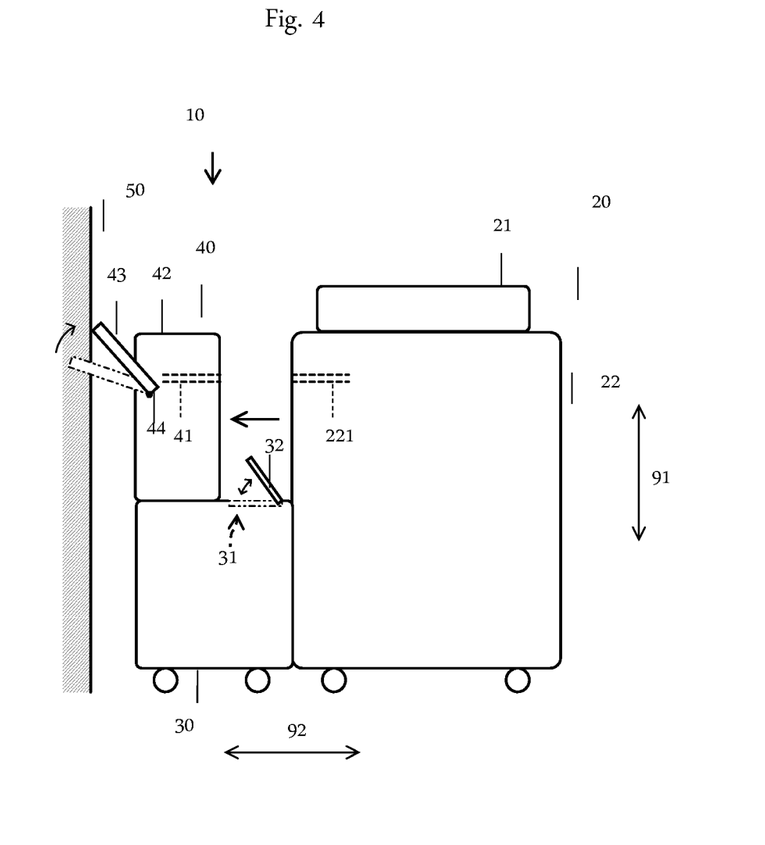
FIG. 4 is a schematic showing a rotatable configuration of a paper receiving tray.

As shown in FIG. 4, in the embodiment, the second processing unit 40 has a second processing unit main body 42 and the paper receiving tray 43. The paper receiving tray 43 is supported by a side face of the second processing unit main body 42 that is on a side opposite to an apparatus main body 20's side in such a manner as to be rotatable within a predetermined range around a shaft member 44 extending in the depth direction 93.

It is preferable that a lower limit position within the rotatable range of the paper receiving tray 43 is a position at which the paper receiving tray 43 slants upward in a direction of going away from the apparatus main body 20, that is to say, in a paper sheet conveyance direction on the paper receiving tray 43. The paper receiving tray 43 is configured in such a manner as to be rotatable upward from the lower limit position. This allows the paper receiving tray 43 to rotate upward even in a case where the paper receiving tray 43 collides with an outside object 50 such as wall or the like when the second processing unit 40 is being moved in the direction of going away from the apparatus main body 20, and thus can prevent the paper receiving tray 43 from being damaged. Besides, even in a case where the paper receiving tray 43 does not collide with an outside object 50 when the second processing unit 40 is being moved in the direction of going away from the apparatus main body 20, the installation area can be reduced by rotating the paper receiving tray 43 upward.

Also, as an example, an upper limit position of the paper receiving tray 43 is a position at which, in the direction of going away from the apparatus main body 20, a downstream side edge portion of the paper receiving tray 43 corresponds with a downstream side edge portion of the second processing unit main body 42 in plane view. Because the shaft member 44 is disposed on the upstream side from the downstream side edge portion of the second processing unit main body 42, at the upper limit position, the downstream side edge portion of the paper receiving tray 43 is disposed on the downstream side from the shaft member 44 in the direction of going away from the apparatus main body 20. This enables the paper receiving tray 43 to rotate from the upper limit position to the lower limit position by its own mass when the second processing unit 40 is moved from the separate position toward the adjacent position. Therefore, there is no need to rotate the paper receiving tray 43, which improves workability.

Additionally, the second processing unit 40 is not necessarily be configured in such a manner as to be capable of being slidingly moved in the approaching-leaving direction 92 while being supported by the top face of the first processing unit 30. The rail member on which the second processing unit 40 travels may also be installed in such a manner as to project in a horizontal direction from the side face of the apparatus main body 20 and be kept away from the top face of the first processing unit 40 with a space in between.

Moreover, the lid member 32 is not necessarily provided. Without the lid member 32 provided, it is still possible to open and close the opening section 31 by slidingly moving the second processing unit 40. In this configuration, a bottom face of the second processing unit 40 can also be considered to function as a lid member.

Further, it is also possible that the processing device is configured in such a manner that dimensional values of a part of the second processing unit 40 except the paper receiving tray 43, that is, the second processing unit main body 42, are not greater than the dimensional values of the first processing unit in the approaching-leaving direction 92 and in the depth direction 93, respectively. Although it is preferable that the second processing unit 40 is not larger than the first processing unit 30 in plane view as stated above, because the paper receiving tray 43 is considerably lighter as compared with the first processing unit 30 and the second processing unit main body 42, the second processing unit 40 can be stably supported by the first processing unit 30 as long as the second processing unit main body 42 is configured in such a manner as not to be larger than the first processing unit 30 in plane view.

Figure 5:
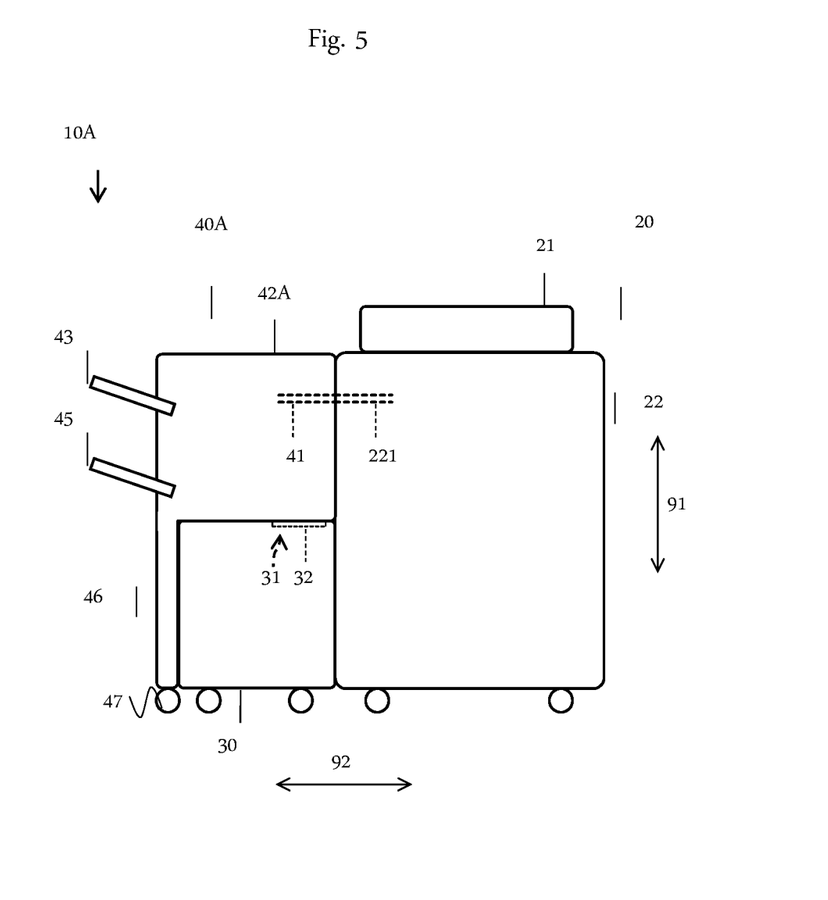
FIG. 5 is a schematic showing a state in which a second processing unit is disposed at an adjacent position in an image forming apparatus according to another embodiment.
Figure 6:
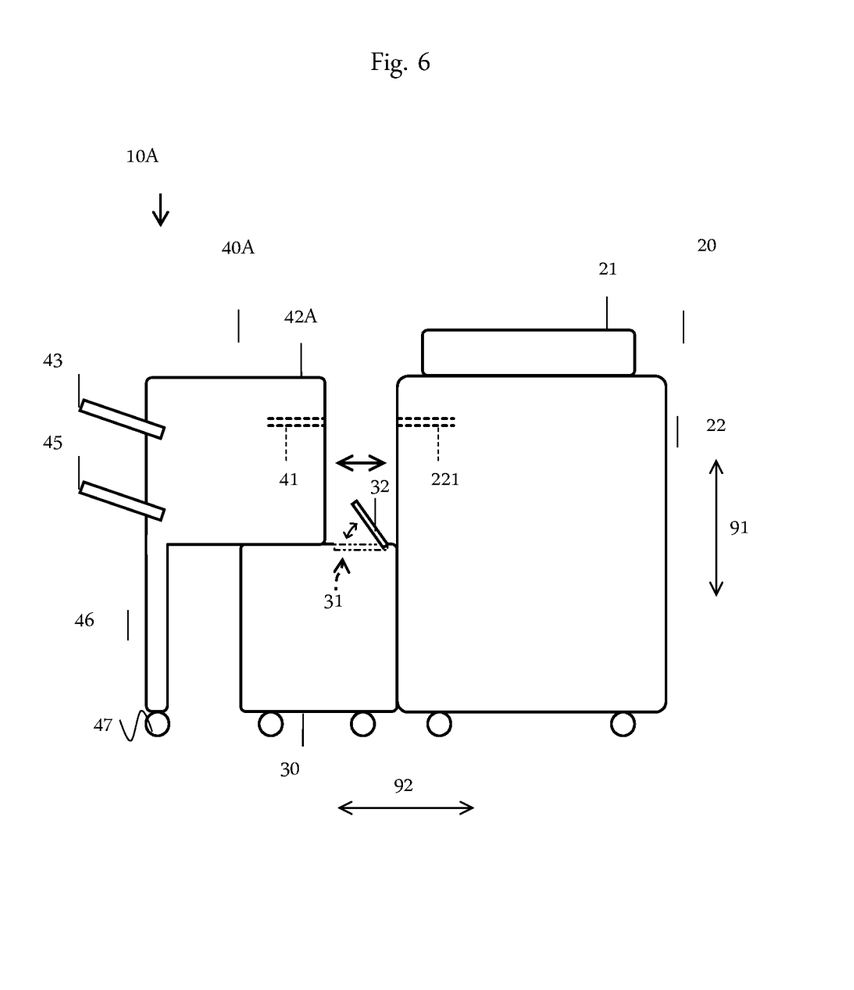
FIG. 6 is a schematic showing a state in which the second processing unit is disposed at a separate position in the image forming apparatus shown in FIG. 5.

As shown in FIG. 5 and FIG. 6, dimensional values of the second processing unit 40 can also be greater than dimensional values of the first processing unit 30 at least in either of the approaching-leaving direction 92 and the depth direction 93. Hereinafter, for the convenience of explanation, the same reference signs are used for members that are similar to those of the embodiment mentioned above.

A second processing unit 40A of an image forming apparatus 10A according to this embodiment is configured in such a manner as to be larger than the first processing unit 30 in the approaching-leaving direction 92. The second processing unit 40A has a second processing unit main body 42A, paper receiving trays 43, 45 and a supporting member 46.

The second processing unit main body 42A is disposed on the upside of the first processing unit 30, and is configured in such a manner as to be capable of being moved on the top face of the first processing unit 30 in the approaching-leaving direction 92.

The paper receiving trays 43, 45 are supported by a side face of the second processing unit main body 42A that is on a side opposite to the apparatus main body 20's side. The paper receiving tray 45 can be configured in the same manner as the paper receiving tray 43.

The supporting member 46 supports the second processing unit main body 42A, extending in vertical direction 91 between a bottom face of the second processing unit main body 42A and the floor surface at a downstream side edge portion in the direction of going away from the apparatus main body 20. The supporting member 46 has, at bottom portions thereof, casters 47. The supporting member 46 is disposed in such a manner as to extend along a side face of the first processing unit 30 at the adjacent position.

When the second processing unit 40A is disposed at the separate position, the second processing unit main body 42A is supported at one edge portion thereof in the approaching-leaving direction 92 by the first processing unit 30, and is supported at the other edge portion thereof by the supporting member 46.

With the image forming apparatus 10A, even when the second processing unit 40A that is disposed on the upside is large or heavy, it can be moved stably.

Additionally, even when the first processing unit 30 and the second processing units 40, 40A are all paper feeders or all post-processors, it is still possible to produce the effects of reducing the installation area as well as easing the maintenance tasks on the first processing unit 30 and the second processing units 40,40A. Also, even when the first processing unit 30 is a post processor and the second processing units 40, 40A are paper feeders, it is still possible to produce similar effects.

The above explanations of the embodiments are nothing more than illustrative in any respect, nor should be thought of as restrictive. Scope of the present invention is indicated by claims rather than the above embodiments. Further, it is intended that all changes that are equivalent to a claim in the sense and realm of the doctrine of equivalence be included within the scope of the present invention.

REFERENCE SIGNS LIST 10, 10A image forming apparatus
20 apparatus main body
30 first processing unit
31 opening section
40, 40 A second processing unit
42, 42A second processing unit main body
43, 45 paper receiving tray
91 vertical direction
92 approaching-leaving direction
93 depth direction

The invention claimed is:

1. An image forming apparatus comprising:
a paper feeder for containing a paper sheet to supply an apparatus main body, the apparatus main body performing an image forming process onto a paper sheet; and
a post-processor for performing a post-processing to a paper sheet that has undergone the image forming process in the apparatus main body, wherein the paper sheet is discharged from an image forming section of the apparatus main body after the image forming process is complete and before the post-processing, wherein
the paper feeder and the post-processor are arranged in a stack along a vertical direction and are arranged on a side face side of the apparatus main body.

2. The image forming apparatus according to claim 1, wherein
in an approaching-leaving direction in relation to the apparatus main body a dimensional value of the post-processor is not larger than a dimensional value of the paper feeder, and
in a depth direction in relation to the apparatus main body a dimensional value of the post-processor is not larger than a dimensional value of the paper feeder, the depth direction being opposite to the approaching-leaving direction and the vertical direction.

3. The image forming apparatus according to claim 1, wherein
the post-processor is disposed on the paper feeder, and
the post-processor is slidable in an approaching-leaving direction in relation to the apparatus main body.

4. The image forming apparatus according to claim 3, wherein
the paper feeder has an opening section on a top surface thereof, the opening section permitting a member related to an image forming process to pass therethrough,
the opening section is exposed between the post-processor and the apparatus main body in a state where the post-processor is disposed at a predetermined separate position that is away from the apparatus main body, and
the opening section is not exposed in a state where the post-processor is disposed at an adjacent position that is adjacent to the apparatus main body.

5. The image forming apparatus according to claim 4, wherein
the paper feeder has a lid member configured to open and close the opening section, and
the lid member is exposed to outside in the state where the post-processor is disposed at the predetermined separate position, and further the opening section is released when the lid member is opened.

6. The image forming apparatus according to claim 3, wherein
the paper feeder is fixed to the apparatus main body, and
the post-processor is slidable in relation to the paper feeder.

7. An image forming apparatus comprising:
a paper feeder for containing a paper sheet to supply an apparatus main body, the apparatus main body performing an image forming process onto a paper sheet; and
a post-processor for performing a post-processing to a paper sheet that has undergone the image forming process in the apparatus main body, wherein
the paper feeder and the post-processor are arranged in a stack along a vertical direction and are arranged on a side face side of the apparatus main body,
the post-processor has a post-processor main body and an extending section,
the post processor main body is disposed on the paper feeder, and
the extending portion extends downward from the post processor main body along a side face of the paper feeder.

8. The image forming apparatus according to claim 7, wherein
the post-processor is disposed on the paper feeder, and
the post-processor is slidable in an approaching-leaving direction in relation to the apparatus main body.

9. The image forming apparatus according to claim 8, wherein
the paper feeder has an opening section on a top surface thereof, the opening section permitting a member related to an image forming process to pass therethrough,
the opening section is exposed between the post-processor and the apparatus main body in a state where the post-processor is disposed at a predetermined separate position that is away from the apparatus main body, and
the opening section is not exposed in a state where the post-processor is disposed at an adjacent position that is adjacent to the apparatus main body.

10. The image forming apparatus according to claim 9, wherein
the paper feeder has a lid member configured to open and close the opening section, and
the lid member is exposed to outside in the state where the post-processor is disposed at the predetermined separate position, and further the opening section is released when the lid member is opened.

11. The image forming apparatus according to claim 8, wherein
the paper feeder is fixed to the apparatus main body, and
the post-processor is slidable in relation to the paper feeder.

12. The image forming apparatus according to claim 7, wherein
the extending section is configured to support the post-processor main body.

* * * * *